United States Patent
Zhang et al.

(10) Patent No.: US 11,825,512 B2
(45) Date of Patent: Nov. 21, 2023

(54) PRIORITY RULE FOR HALF DUPLEX UES ON PRECONFIGURED DOWNLINK SYMBOLS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/454,220

(22) Filed: Nov. 9, 2021

(65) Prior Publication Data

US 2023/0142385 A1 May 11, 2023

(51) Int. Cl.
*H04W 72/566* (2023.01)
*H04L 5/16* (2006.01)

(52) U.S. Cl.
CPC ............ *H04W 72/569* (2023.01); *H04L 5/16* (2013.01)

(58) Field of Classification Search
None
See application file for complete search history.

(56) References Cited

U.S. PATENT DOCUMENTS

2019/0372727 A1* 12/2019 Joseph .................... H04L 5/005
2022/0166591 A1* 5/2022 Aiba ..................... H04L 5/0055

OTHER PUBLICATIONS

ETSI TS 138 331: "5G, NR, Radio Resource Control (RRC), Protocol specification (3GPP TS 38.331 version 16.4.1 Release 16)", ETSI Technical Specification, European Telecommunications Standards Institute (ETSI), 650, Route Des Lucioles, F-06921 Sophia-Antipolis, France, vol. 3GPP RAN, No. V16.4.1, Apr. 16, 2021, pp. 1-932, XP014396739, p. 547-549, p. 557, p. 648.
International Search Report and Written Opinion—PCT/US2022/046469—ISA/EPO—dated Jan. 31, 2023.
OPPO: "On Half-duplex Operation", 3GPP TSG RAN WG1 #105-e, R1-2104784, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, 5 Pages, May 12, 2021, XP052011025, p. 5, line 3-line 6 p. 4, line 36-line 37.

(Continued)

*Primary Examiner* — Hong Shao
(74) *Attorney, Agent, or Firm* — Procopio, Cory, Hargreaves & Savitch LLP

(57) ABSTRACT

Method and apparatus for a priority rule for half duplex wireless devices on preconfigured downlink symbols. The apparatus receives, from a base station, a downlink schedule configuration comprising downlink resources and uplink transmission occasion resources and a corresponding periodicity. The apparatus prioritizes transmission of at least one uplink transmission over a preconfigured downlink reception based on a priority configuration. The priority configuration allowing for uplink transmissions to be transmitted in resources scheduled for the preconfigured downlink reception. The apparatus transmits, to the base station, the at least one uplink transmission based on the priority configuration.

30 Claims, 13 Drawing Sheets

(56) References Cited

OTHER PUBLICATIONS

ZTE et al., "HD-FDD for Reduced Capability NR Devices", 3GPP TSG RAN WG1 #106-e, R1-2106843, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 13 Pages, Aug. 6, 2021, XP052033289, p. 1, line 3, Section 2, p. 1, line 9-10, p. 6, line 42, first textbox, p. 7, p. 8, line 1-2, p. 4, line 1, last textbox, p. 2, p. 7, line 42-44 p. 1, line 15-16.

* cited by examiner

PRIORITY RULE FOR HALF DUPLEX UES ON PRECONFIGURED DOWNLINK SYMBOLS

TECHNICAL FIELD

The present disclosure relates generally to communication systems, and more particularly, to a priority rule for half duplex wireless devices on preconfigured downlink symbols.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, a downlink schedule configuration comprising downlink resources and uplink transmission occasion resources and a corresponding periodicity. The apparatus prioritizes transmission of at least one uplink transmission over a preconfigured downlink reception based on a priority configuration. The priority configuration allowing for uplink transmissions to be transmitted in resources scheduled for the preconfigured downlink reception. The apparatus transmits, to the base station, the at least one uplink transmission based on the priority configuration.

In an aspect of the disclosure, a method, a computer-readable medium, and an apparatus are provided. The apparatus may be a device at a base station. The device may be a processor and/or a modem at a base station or the base station itself. The apparatus transmits, to a user equipment (UE), a downlink schedule configuration comprising downlink resources and uplink transmission occasion resources and a corresponding periodicity. The apparatus communicates, with the UE, based on a priority configuration, the priority configuration allowing for at least one uplink transmission to be transmitted in resources scheduled for a preconfigured downlink reception.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
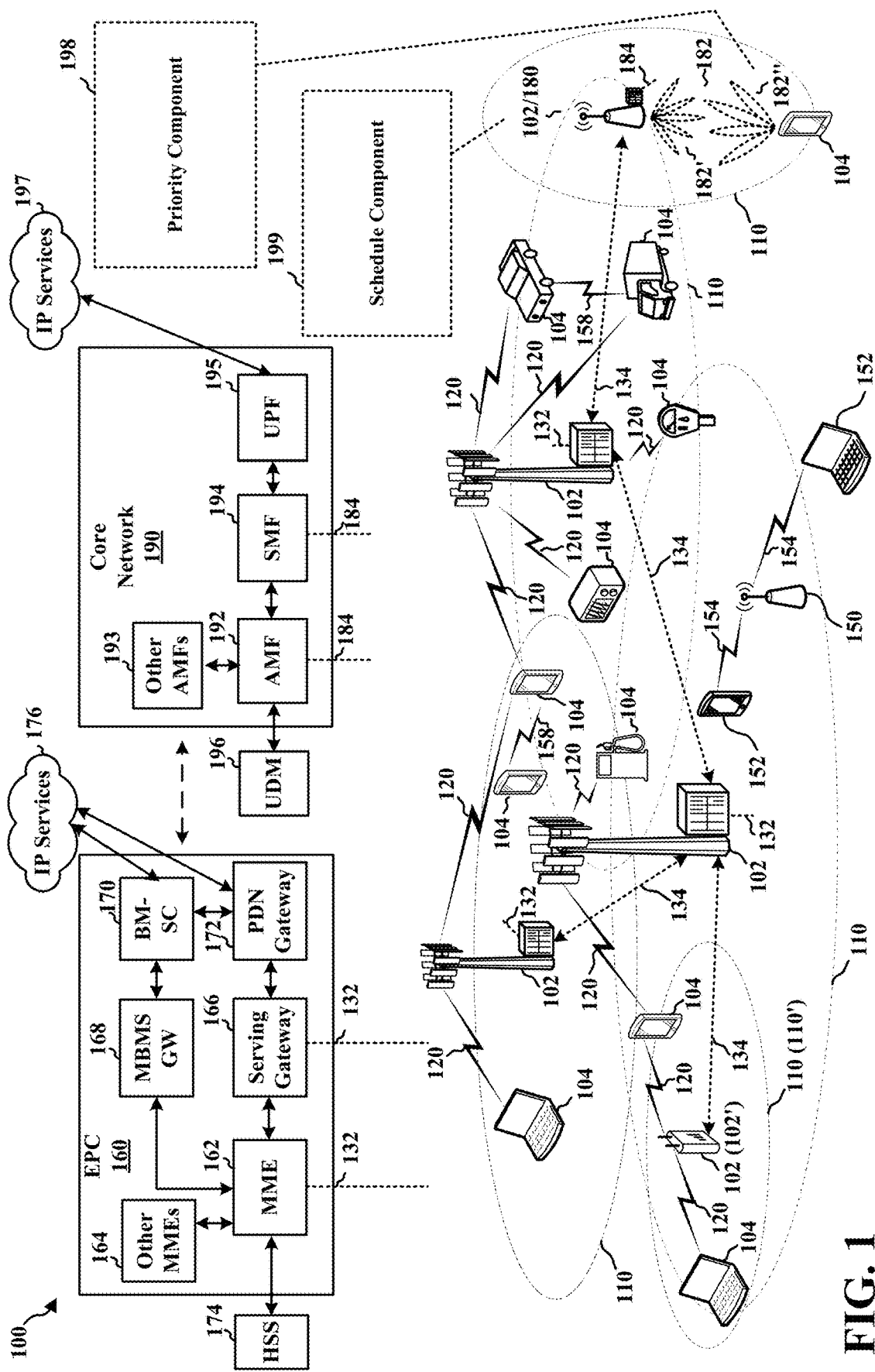
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to prioritize transmission of uplink transmissions over preconfigured downlink receptions based on a priority configuration. For example, UE 104 may comprise a priority component 198 configured to prioritize transmission of uplink transmissions over preconfigured downlink receptions based on a priority configuration. The UE 104 may receive, from a base station 108, a downlink schedule configuration comprising downlink resources and uplink transmission occasion resources and a corresponding periodicity. The UE 104 may prioritize transmission of at least one uplink transmission over a preconfigured downlink reception based on a priority configuration. The priority configuration allowing for uplink transmissions to be transmitted in resources scheduled for the preconfigured downlink reception. The UE 104 may transmit, to the base station, the at least one uplink transmission based on the priority configuration.

Referring again to FIG. 1, in certain aspects, the base station 180 may be configured to provide a UE with a preconfigured downlink resources and uplink transmission occasions resources and periodicity. For example, that base station 180 may comprise a schedule component 199 configured to provide a UE with a preconfigured downlink resources and uplink transmission occasions resources and periodicity. The base station 180 may transmit, to a UE, a downlink schedule configuration comprising downlink resources and uplink transmission occasion resources and a corresponding periodicity. The base station 180 may communicate, with the UE 104, based on a priority configuration. The priority configuration allowing for at least one uplink transmission to be transmitted in resources scheduled for a preconfigured downlink reception.

Although the following description may be focused on 5G NR, the concepts described herein may be applicable to other similar areas, such as LTE, LTE-A, CDMA, GSM, and other wireless technologies.

Figure 2:
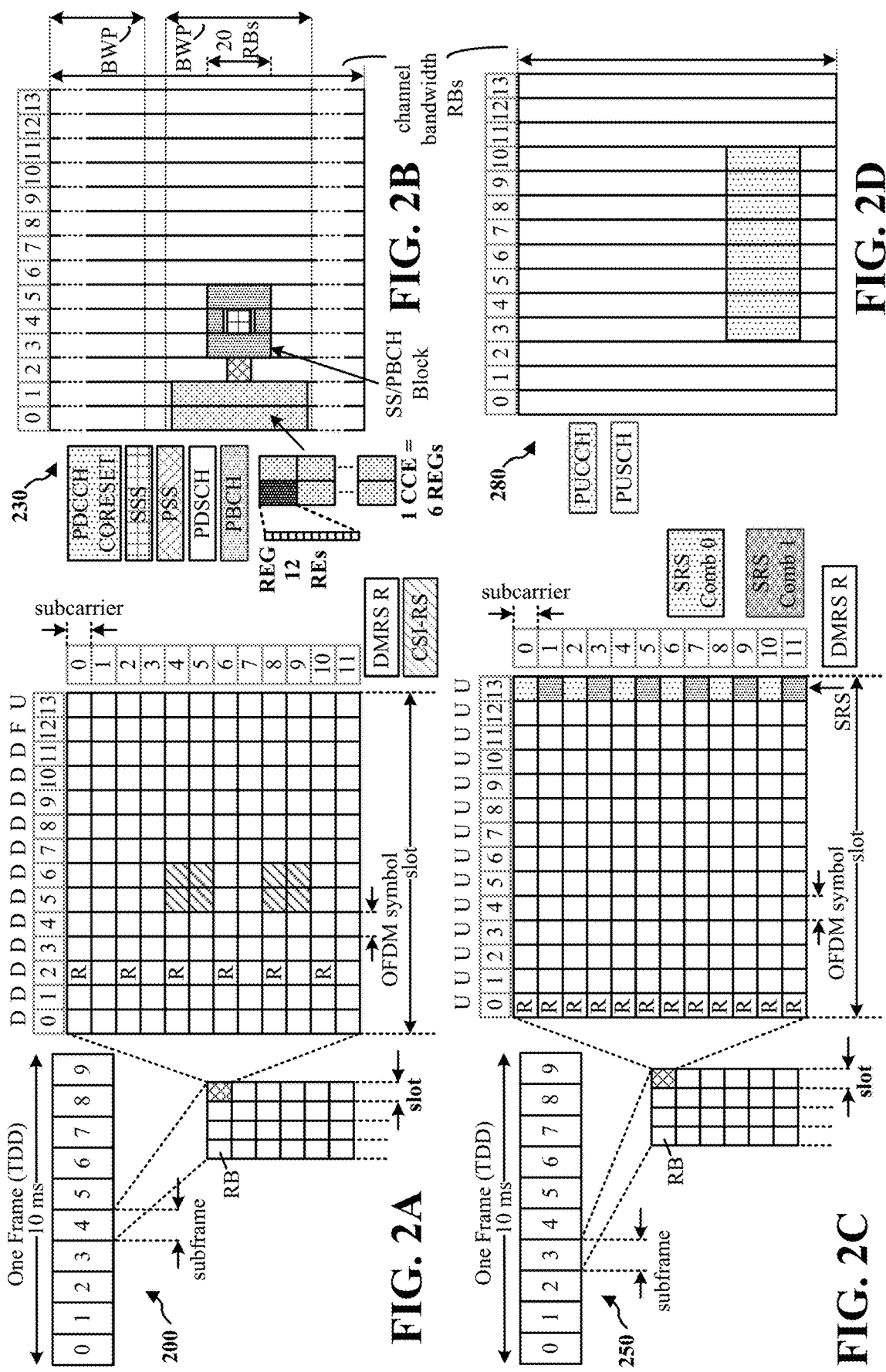
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
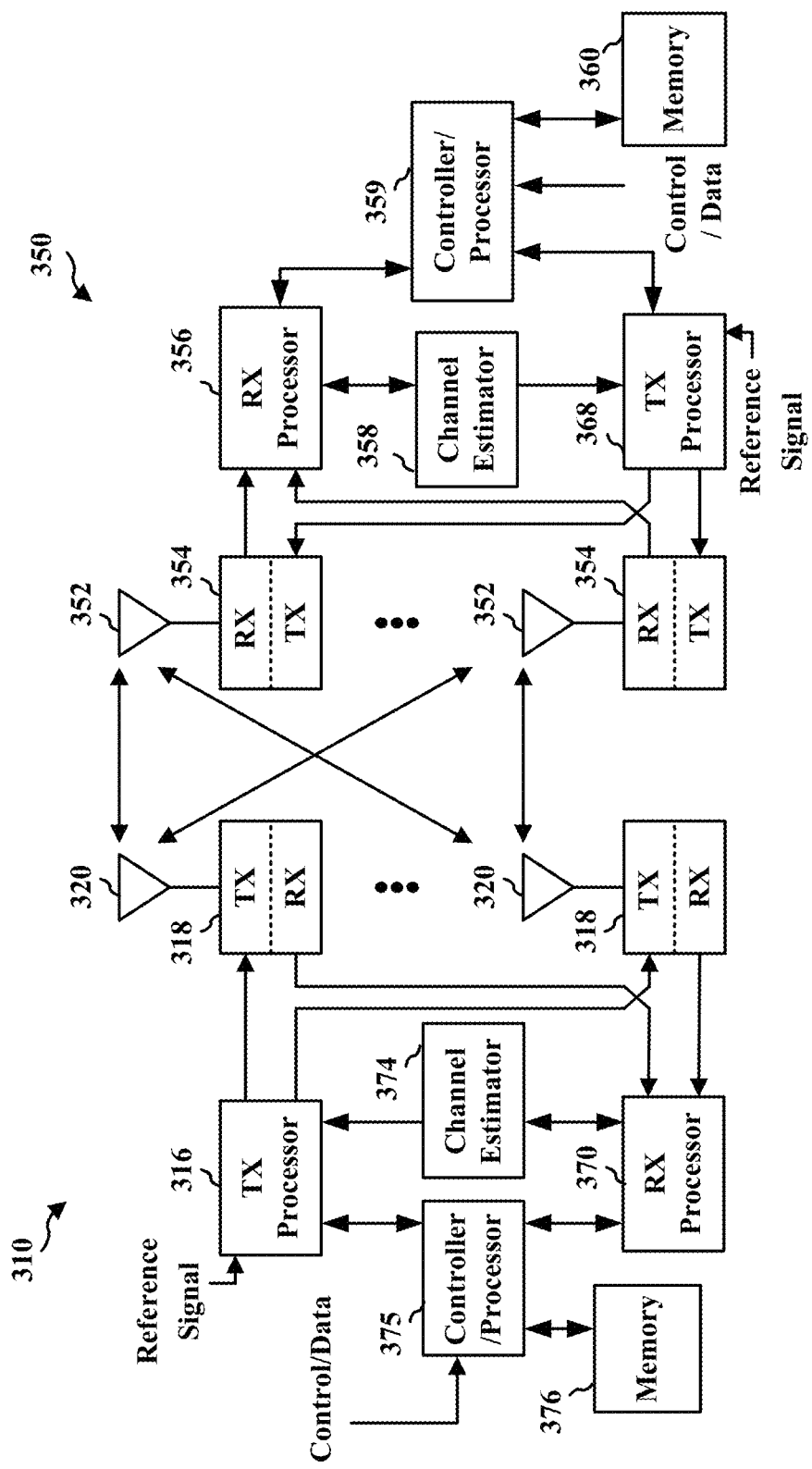
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communications, full duplex (FD) capability may be present at base stations, UEs, or both. For example, at UEs, uplink transmissions may occur at one panel, while downlink receptions may occur at another panel. At base stations, uplink transmissions may occur at one panel, while downlink receptions may occur in another panel. FD capability may be conditional on beam separation, such that self-interference may be between downlink and uplink. At least one advantage of FD is a reduction of latency. For example, FD may allow for the reception of downlink in uplink only slots, which may enable latency savings. At least another advantage of FD may include an enhancement of spectrum efficiency per cell or per UE, as well as an increase in resource utilization.

Figure 4C:
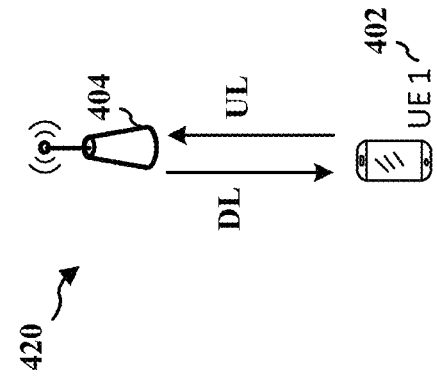
FIGS. 4A-4C are diagrams illustrating examples of full duplex communications.
Figure 4B:
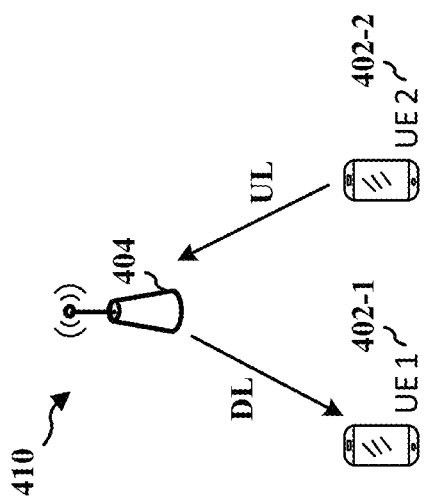
Figure 4A:
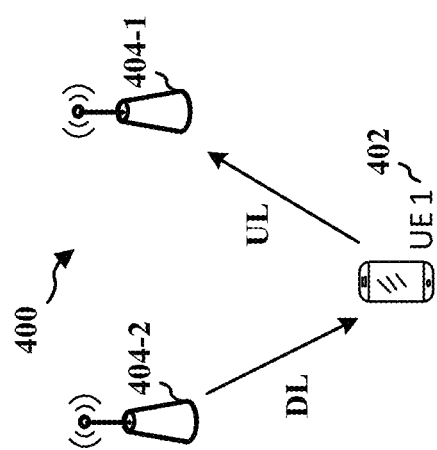

FIGS. 4A-4C are diagrams illustrating examples 400, 410, and 420 of FD communication. The example 400 of FIG. 4A includes a UE1 402 and two base stations 404-1, 404-2, wherein the UE1 402 is sending uplink transmissions to base station 404-1 and is receiving downlink transmissions from base station 404-2. In the example 400 of FIG. 4A, FD is enabled for the UE1 402, but not for the base stations 404-1, 404-2. The example 410 of FIG. 4B includes two UEs, UE1 402-1 and UE2 402-2 and a base station 404, wherein the UE1 402-1 is receiving a downlink transmission from the base station 404 and the UE2 402-2 is transmitting an uplink transmission to the base station 404. In the example 410 of FIG. 4B, FD is enabled at the base station 404, but not for the UEs UE1 402-1 and UE2 402-2. The example 420 of FIG. 4C includes a UE1 402 and a base station 404, wherein the UE1 402 is receiving a downlink transmission from the base station 404 and the UE1 402 is transmitting an uplink transmission to the base station 404. In the example 420 of FIG. 4C, FD is enabled for both the UE1 402 and the base station 404.

Figure 5:
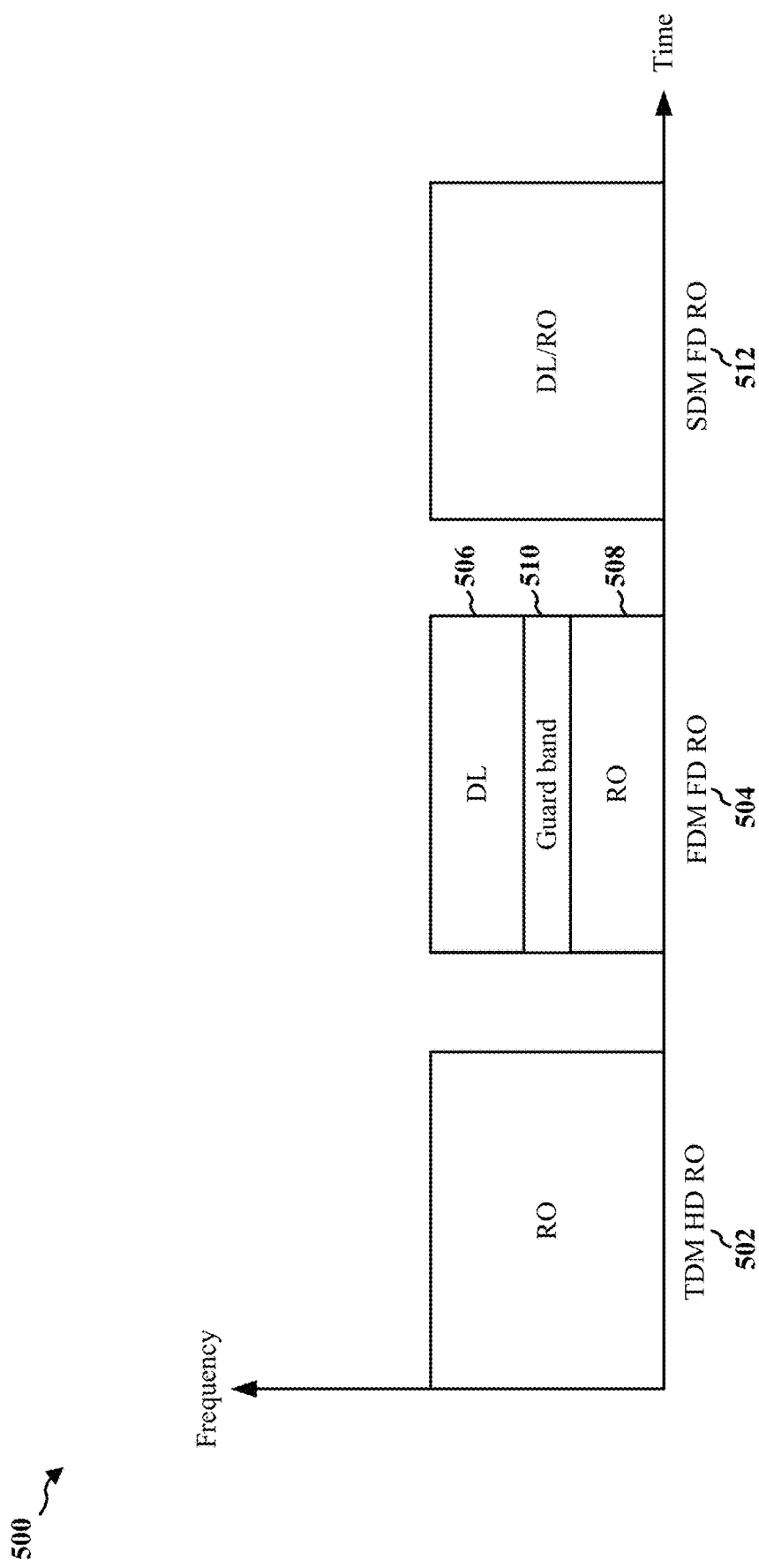
FIG. 5 is a diagram illustrating an example of half duplex and full duplex RACH occasions.

FIG. 5 is a diagram 500 illustrating an example of half duplex (HD) and FD RACH occasions. In HD mode, random access channel (RACH) occasions (RO) may not overlap in time with downlink transmissions, such as but not limited to synchronization signal block (SSB), a physical downlink control channel (PDCCH), a physical downlink shared channel (PDSCH), or a channel state information reference signal (CSI-RS), which may be known as time division multiplexed RACH (e.g., 502). For FD mode, RO may overlap in time with downlink transmissions, such as but not limited to SSB, PDCCH, PDSCH, to enable more efficient system and lower latency. For example, frequency division multiplexed FD RO (e.g., 504) may include RO 508 and downlink transmissions 506 that share the same time resources but at different or partially different frequency resources, with a guard band 510 in between the RO 508 and downlink transmissions 506. In some instances, spatial division multiplexed FD RO (e.g., 512) may include RO and downlink transmissions that share the same time and frequency resources.

Figure 6:
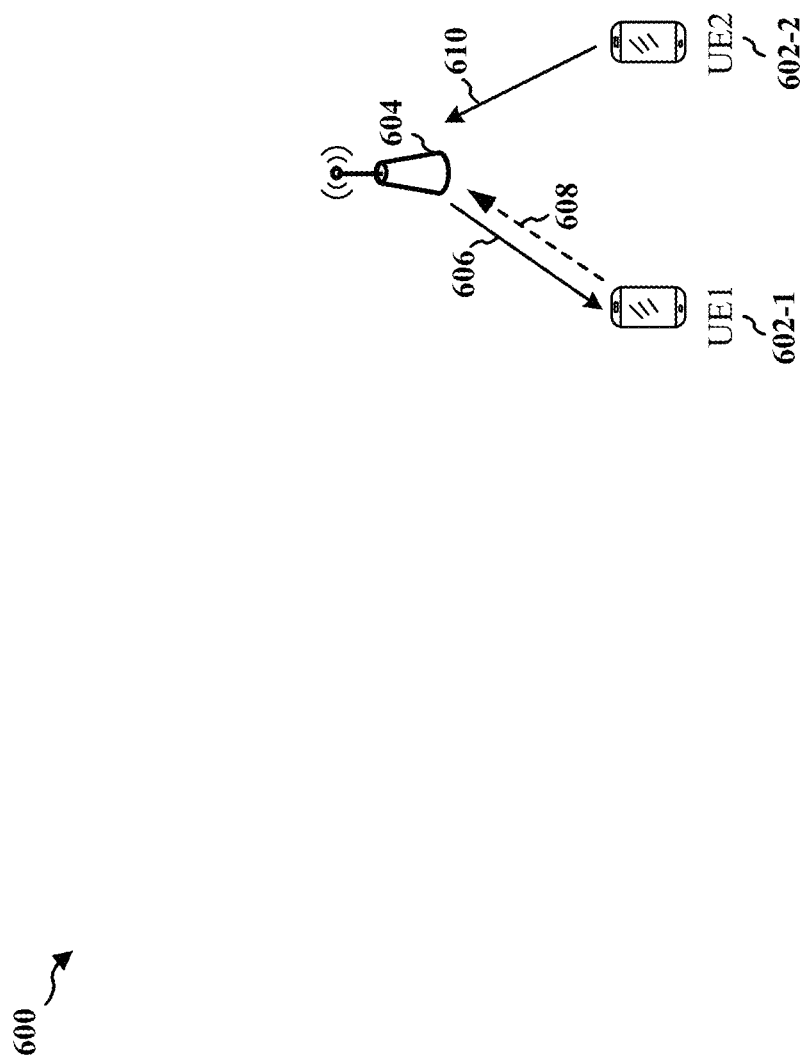
FIG. 6 is a diagram illustrating an example of a base station configured with full duplex.

FIG. 6 is a diagram 600 illustrating an example of a base station configured with FD. The diagram 600 includes a first UE UE1 602-1, a second UE UE2 602-2, and a base station 604. The base station 604 may be configured with FD, while the UEs (e.g., UE1 602-1, UE2 602-2) may not be configured with FD. For base stations in FD mode, the base station (e.g., 604) may schedule preconfigured downlink transmissions 606 to a UE (e.g., UE1 602-1), such as semi-persistent scheduling (SPS) occasions or periodic reference signals that may overlap and may be frequency division multiplexed with uplink RO (e.g., 610) in either frequency division multiplex or spatial division multiplex FD mode. However, in some instances, the UE1 602-2 may need to send an uplink transmission 608 (e.g., RACH preamble) to the base station 604, such as in response to beam failure, instead of receiving a preconfigured downlink reception 606.

In yet some instances, the base station may schedule preconfigured downlink receptions 606 (e.g., SPS occasions or periodic CSI-RS) that overlap and are full duplexed with uplink transmissions 610 (e.g., PUCCH, PUSCH) in either frequency division multiplex or spatial division multiplex FD mode. The UE1 602-2 may need to send the uplink transmission 608 (e.g., high priority scheduling request) to the base station 604 instead of receiving the preconfigured downlink reception 606.

Aspects presented herein provide a configuration for a priority rule for half duplex wireless devices on preconfigured downlink symbols. For example, a UE may be configured to prioritize transmission of uplink transmissions over preconfigured downlink receptions based on a priority configuration.

In some instances, base stations may provide HD UEs with a schedule comprising preconfigured downlink resources and uplink RO symbols or resources along with a periodicity for the HD UEs. The UE may send a capability indication that indicates whether or not the UE is configured to support the schedule comprising preconfigured downlink resources and uplink RO symbols or resources. In instances where the UE supports the schedule comprising preconfigured downlink resources and uplink RO symbols or resources, the UE may ignore the preconfigured downlink receptions and prioritize the transmission of uplink transmissions (e.g., RO or high priority scheduling requests). As such, the UE which was preconfigured or scheduled to receive the downlink scheduled reception may understand that the symbols are FD symbols and may prioritize uplink transmissions for RO or high priority scheduling request over the preconfigured downlink receptions.

In instances where the UE does not support the schedule comprising preconfigured downlink resources and uplink RO symbols or resources, the base station may dynamically indicate to the UE to prioritize the transmission of uplink transmissions (e.g., RO or high priority scheduling requests) over the preconfigured downlink receptions. The UE may transmit the uplink transmissions on certain symbols in response to the indication from the base station to prioritize the transmission of the uplink transmissions over the preconfigured downlink receptions.

Figure 7:
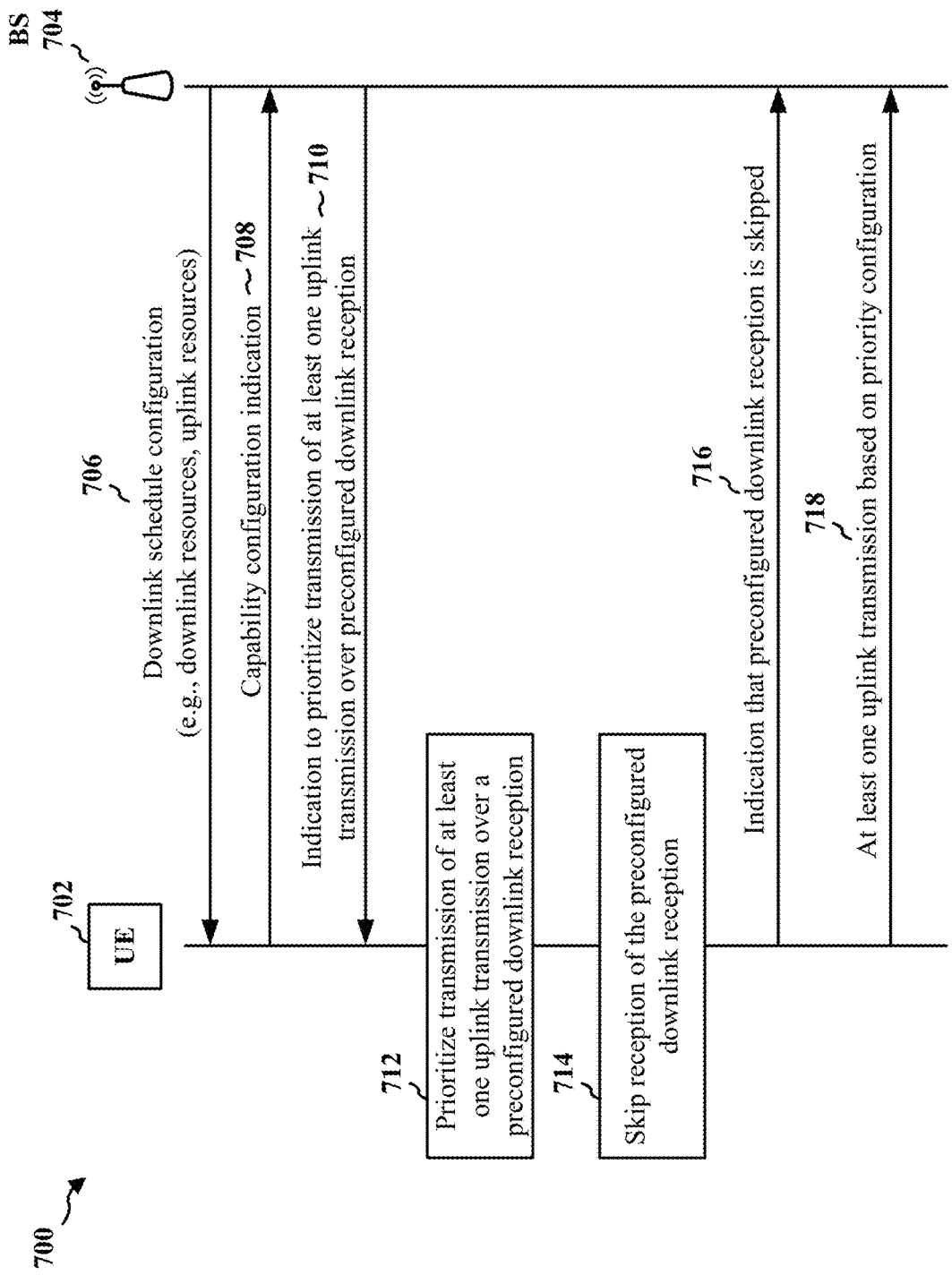
FIG. 7 is a call flow diagram of signaling between a UE and a base station.

FIG. 7 is a call flow diagram 700 of signaling between a UE 702 and a base station 704. The base station 704 may be configured to provide at least one cell. The UE 702 may be configured to communicate with the base station 704. For example, in the context of FIG. 1, the base station 704 may correspond to base station 102/180 and, accordingly, the cell may include a geographic coverage area 110 in which communication coverage is provided and/or small cell 102' having a coverage area 110'. Further, a UE 702 may correspond to at least UE 104. In another example, in the context of FIG. 3, the base station 704 may correspond to base station 310 and the UE 702 may correspond to UE 350.

At 706, the base station 704 may transmit a downlink schedule configuration. The base station may transmit the downlink schedule configuration to the UE 702. The UE 702 may receive the downlink schedule configuration from the base station 704. The downlink schedule configuration may comprise downlink resources and uplink transmission occasion resources and a corresponding periodicity.

At 708, the UE 702 may transmit a capability configuration indication. The UE may transmit the capability configuration indication to the base station 704. The base station 704 may receive the capability configuration indication from the UE 702. The capability configuration indication may indicate that the UE is compatible with the downlink schedule configuration provided by the base station. In some aspects, the downlink schedule configuration may comprise preconfigured downlink resources and uplink transmission occasions that at least partially overlap in time. The downlink schedule configuration may indicate the preconfigured downlink and RACH occasion symbols or resources with the periodicity, but some UEs may or may not be compatible with such downlink schedule configuration. The UE may transmit the capability configuration indication to indicate whether the UE is a UE that is compatible with or supports the downlink schedule configuration from the base station.

At 710, the base station 704 may transmit an indication to prioritize transmission of the at least one uplink transmission over the preconfigured reception. The base station may transmit the indication to prioritize the transmission of the at least one uplink transmission over the preconfigured reception to the UE 702. The UE 702 may receive the indication to prioritize transmission of the at least one uplink transmission over the preconfigured downlink reception from the base station 704. The base station may transmit the indication to prioritize the transmission of the at least one uplink transmission over the preconfigured reception to the UE if the UE is not compatible with the downlink schedule configuration. For example, the UE may indicate in the capability configuration indication that the UE is not compatible with or does not support the downlink schedule configuration, such that the base station may instruct the UE when to prioritize the transmission of the at least one uplink transmission. For example, a UE may need to transmit a high priority SR or a RACH preamble due to beam failure, but may not be compatible with or support the downlink schedule configuration, such that the UE may need instructions from the base station to transmit the uplink transmission instead of receiving the preconfigured or scheduled downlink reception.

At 712, the UE 702 may prioritize transmission of at least one uplink transmission over a preconfigured downlink reception. The UE may prioritize transmission of at least one uplink transmission over the preconfigured downlink reception based on a priority configuration. The priority configuration may allow for uplink transmissions to be transmitted in resources scheduled for the preconfigured downlink reception. In some aspects, the at least one uplink transmission may have a higher priority over the preconfigured downlink reception. In some aspects, the at least one uplink transmission may comprise at least one of a RACH occasion or a SR. In some aspects, the preconfigured downlink reception may comprise at least one of an SSB, a PDCCH, a PDSCH, or a CSI-RS.

At 714, the UE 702 may skip receipt of the preconfigured downlink reception. The UE may skip the receipt of the preconfigured downlink reception in response to a prioritization of the transmission of the at least one uplink transmission over the preconfigured downlink reception.

At 716, the UE 702 may transmit an indication that indicates that the preconfigured downlink reception may be skipped. The UE 702 may transmit the indication that indicates that the preconfigured downlink reception may be skipped to the base station 704. The base station 704 may receive the indication that the preconfigured downlink reception may be skipped from the UE 702. The indication may further indicate that the at least one uplink transmission may be transmitted.

At 718, the UE 702 may transmit the at least one uplink transmission to the base station 704. The base station 704 may receive the at least one uplink transmission from the UE 702. The UE may transmit the at least one uplink transmission to the base station based on the priority configuration.

Figure 8:
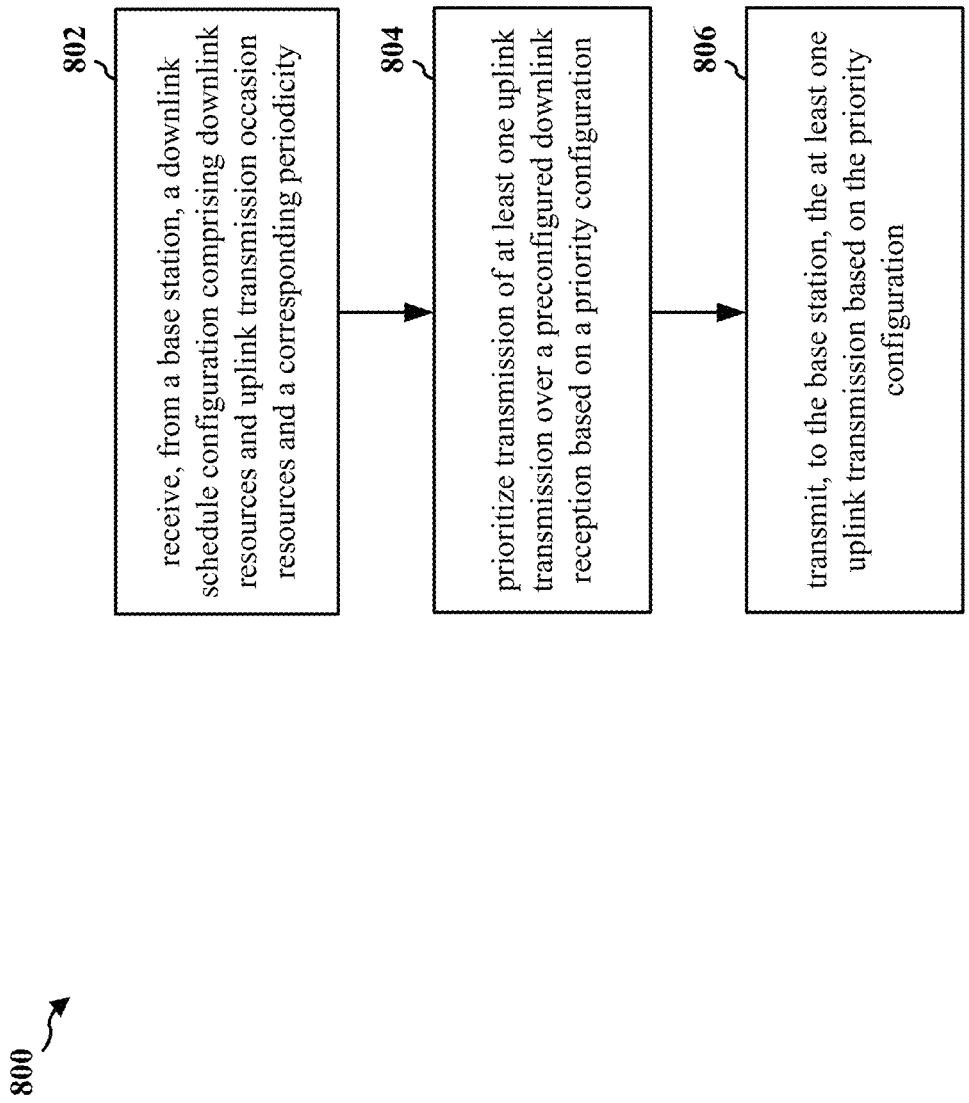
FIG. 8 is a flowchart of a method of wireless communication.

FIG. 8 is a flowchart 800 of a method of wireless communication. The method may be performed by a UE or a component of a UE (e.g., the UE 104; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to prioritize transmission of uplink transmissions over preconfigured downlink receptions based on a priority configuration.

At 802, the UE may receive a downlink schedule configuration. For example, 802 may be performed by schedule component 1040 of apparatus 1002. The UE may receive the downlink schedule configuration from a base station. The downlink schedule configuration may comprise downlink resources and uplink transmission occasion resources and a corresponding periodicity.

At 804, the UE may prioritize transmission of at least one uplink transmission over a preconfigured downlink reception. For example, 804 may be performed by priority component 1044 of apparatus 1002. The UE may prioritize transmission of at least one uplink transmission over the preconfigured downlink reception based on a priority configuration. The priority configuration may allow for uplink transmissions to be transmitted in resources scheduled for the preconfigured downlink reception. In some aspects, the at least one uplink transmission may have a higher priority over the preconfigured downlink reception. In some aspects, the at least one uplink transmission may comprise at least one of a RACH occasion or a scheduling request (SR). In some aspects, the preconfigured downlink reception may comprise at least one of a SSB, a PDCCH, a PDSCH, or a CSI-RS.

At 806, the UE may transmit the at least one uplink transmission. For example, 806 may be performed by UL component 1048 of apparatus 1002. The UE may transmit the at least one uplink transmission to the base station. The UE may transmit the at least one uplink transmission to the base station based on the priority configuration.

Figure 9:
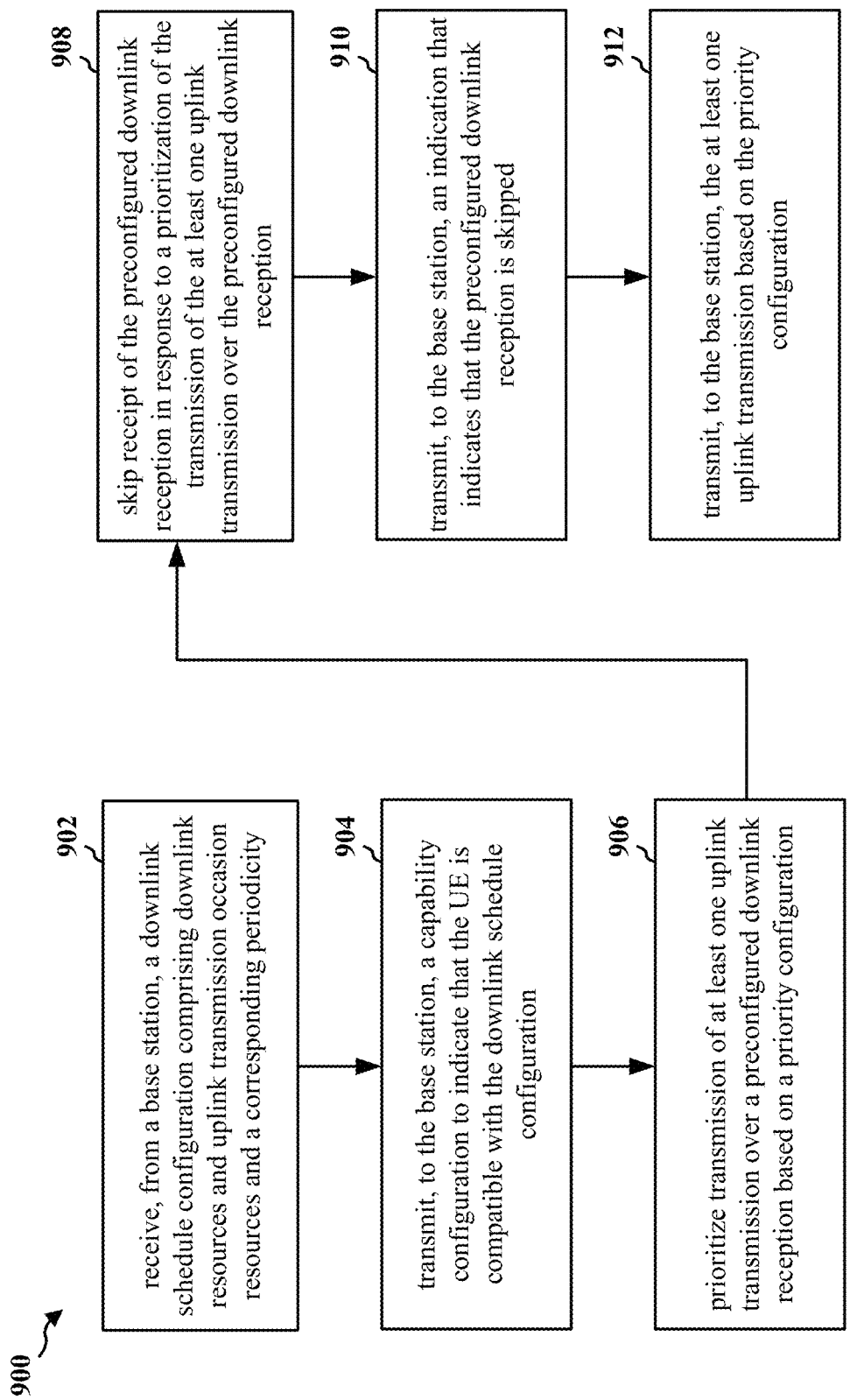
FIG. 9 is a flowchart of a method of wireless communication.

FIG. 9 is a flowchart 900 of a method of wireless communication. The method may be performed by a UE or a component of a UE (e.g., the UE 104; the apparatus 1002; the cellular baseband processor 1004, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to prioritize transmission of uplink transmissions over preconfigured downlink receptions based on a priority configuration.

At 902, the UE may receive a downlink schedule configuration. For example, 902 may be performed by schedule component 1040 of apparatus 1002. The UE may receive the downlink schedule configuration from a base station. The downlink schedule configuration may comprise downlink resources and uplink transmission occasion resources and a corresponding periodicity.

At 904, the UE may transmit a capability configuration indication. For example, 904 may be performed by capability component 1042 of apparatus 1002. The UE may transmit the capability configuration indication to the base station. The capability configuration indication may indicate that the UE is compatible with the downlink schedule configuration provided by the base station. In some aspects, the downlink schedule configuration may comprise preconfigured downlink resources and uplink transmission occasions that at least partially overlap in time. The downlink schedule configuration may indicate the preconfigured downlink and RACH occasion symbols or resources with the periodicity, but some UEs may or may not be compatible with such downlink schedule configuration. The UE may transmit the capability configuration indication to indicate whether the UE is a UE that is compatible with or supports the downlink schedule configuration from the base station.

At 906, the UE may prioritize transmission of at least one uplink transmission over a preconfigured downlink reception. For example, 906 may be performed by priority component 1044 of apparatus 1002. The UE may prioritize transmission of at least one uplink transmission over the preconfigured downlink reception based on a priority configuration. The priority configuration may allow for uplink transmissions to be transmitted in resources scheduled for the preconfigured downlink reception. In some aspects, the at least one uplink transmission may have a higher priority over the preconfigured downlink reception. In some aspects, the at least one uplink transmission may comprise at least one of a RACH occasion or a SR. In some aspects, the preconfigured downlink reception may comprise at least one of an SSB, a PDCCH, a PDSCH, or a CSI-RS.

At 908, the UE may skip receipt of the preconfigured downlink reception. For example, 908 may be performed by skip component 1046 of apparatus 1002. The UE may skip the receipt of the preconfigured downlink reception in response to a prioritization of the transmission of the at least one uplink transmission over the preconfigured downlink reception.

At 910, the UE may transmit an indication that indicates that the preconfigured downlink reception may be skipped. For example, 910 may be performed by skip component 1046 of apparatus 1002. The UE may transmit the indication that indicates that the preconfigured downlink reception may be skipped to the base station. The indication may further indicate that the at least one uplink transmission may be transmitted.

At 912, the UE may transmit the at least one uplink transmission. For example, 912 may be performed by UL component 1048 of apparatus 1002. The UE may transmit the at least one uplink transmission to the base station. The UE may transmit the at least one uplink transmission to the base station based on the priority configuration.

Figure 10:
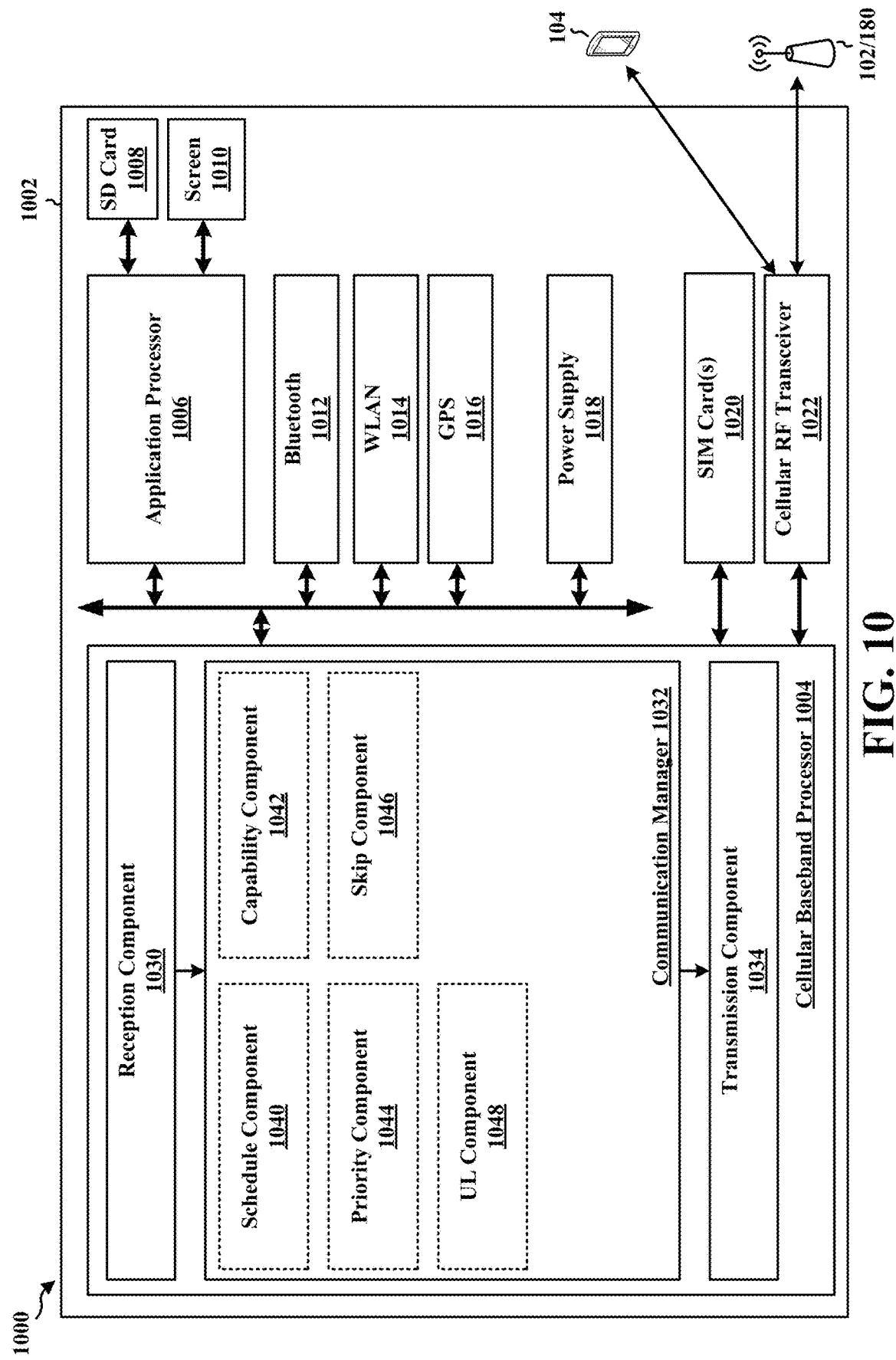
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE, a component of a UE, or may implement UE functionality. In some aspects, the apparatus 1002 may include a cellular baseband processor 1004 (also referred to as a modem) coupled to a cellular RF transceiver 1022. In some aspects, the apparatus 1002 may further include one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, or a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the additional modules of the apparatus 1002.

The communication manager 1032 includes a schedule component 1040 that is configured to receive a downlink schedule configuration, e.g., as described in connection with 802 of FIG. 8 or 902 of FIG. 9. The communication manager 1032 further includes a capability component 1042 that is configured to transmit a capability configuration indication, e.g., as described in connection with 904 of FIG. 9. The communication manager 1032 further includes a priority component 1044 that is configured to prioritize transmission of at least one uplink transmission over a preconfigured downlink reception, e.g., as described in connection with 804 of FIG. 8 or 906 of FIG. 9. The communication manager 1032 further includes a skip component 1046 that is configured to skip receipt of the preconfigured downlink reception, e.g., as described in connection with 908 of FIG. 9. the skip component 1046 may be further configured to transmit an indication that indicates that the preconfigured downlink reception may be skipped, e.g., as described in connection with 910 of FIG. 9. The communication manager 1032 further includes a UL component 1048 that is configured to transmit the at least one uplink transmission, e.g., as described in connection with 806 of FIG. 8 or 912 of FIG. 9.

The apparatus may include additional components that perform each of the blocks of the algorithm in the flowcharts of FIGS. 8 and 9. As such, each block in the flowcharts of FIGS. 8 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1002 may include a variety of components configured for various functions. In one configuration, the apparatus 1002, and in particular the cellular baseband processor 1004, includes means for receiving, from a base station, a downlink schedule configuration comprising downlink resources and uplink transmission occasion resources and a corresponding periodicity. The apparatus includes means for prioritizing transmission of at least one uplink transmission over a preconfigured downlink reception based on a priority configuration. The priority configuration allowing for uplink transmissions to be transmitted in resources scheduled for the preconfigured downlink reception. The apparatus includes means for transmitting, to the base station, the at least one uplink transmission based on the priority configuration. The apparatus further includes means for transmitting, to the base station, a capability configuration to indicate that the UE is compatible with the downlink schedule configuration. The apparatus further includes means for skipping receipt of the preconfigured downlink reception in response to a prioritization of the transmission of the at least one uplink transmission over the preconfigured downlink reception. The apparatus further includes means for transmitting, to the base station, an indication that indicates that the preconfigured downlink reception is skipped. The indication further indicates that the at least one uplink transmission is being transmitted. The means may be one or more of the components of the apparatus 1002 configured to perform the functions recited by the means. As described supra, the apparatus 1002 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 11:
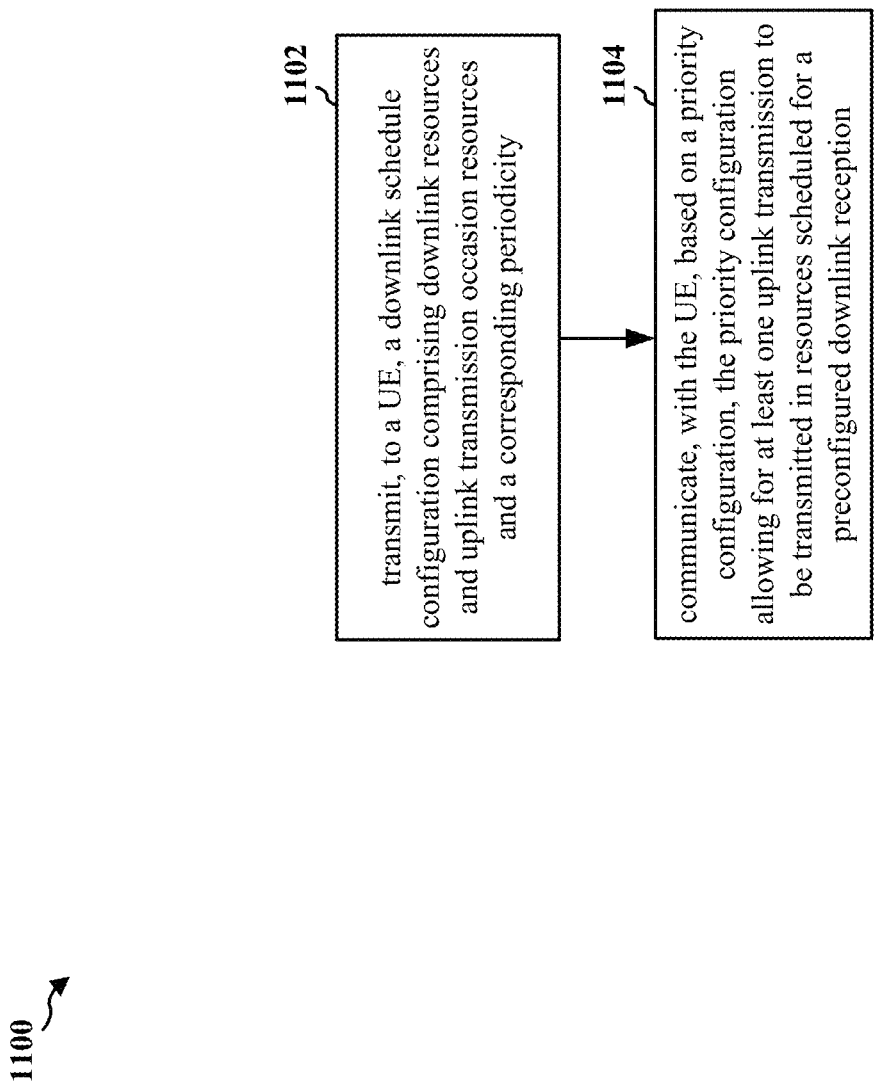
FIG. 11 is a flowchart of a method of wireless communication.

FIG. 11 is a flowchart 1100 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide a UE with a preconfigured downlink resources and uplink transmission occasions resources and periodicity.

At 1102, the base station may transmit a downlink schedule configuration. For example, 1102 may be performed by schedule component 1340 of apparatus 1302. The base station may transmit the downlink schedule configuration to the UE. The downlink schedule configuration may comprise downlink resources and uplink transmission occasion resources and a corresponding periodicity.

At 1104, the base station may communicate based on a priority configuration. For example, 1104 may be performed by communication component 1348 of apparatus 1302. The base station may communication with the UE based on the priority configuration. The priority configuration may allow for at least one uplink transmission to be transmitted in resources scheduled for a preconfigured downlink reception. In some aspects, the at least one uplink transmission may have a higher priority over the preconfigured downlink reception. In some aspects, the at least one uplink transmission may comprise at least one of a RACH occasion or an SR. In some aspects, the preconfigured downlink reception may comprise at least one of an SSB, a PDCCH, a PDSCH, or a CSI-RS.

Figure 12:
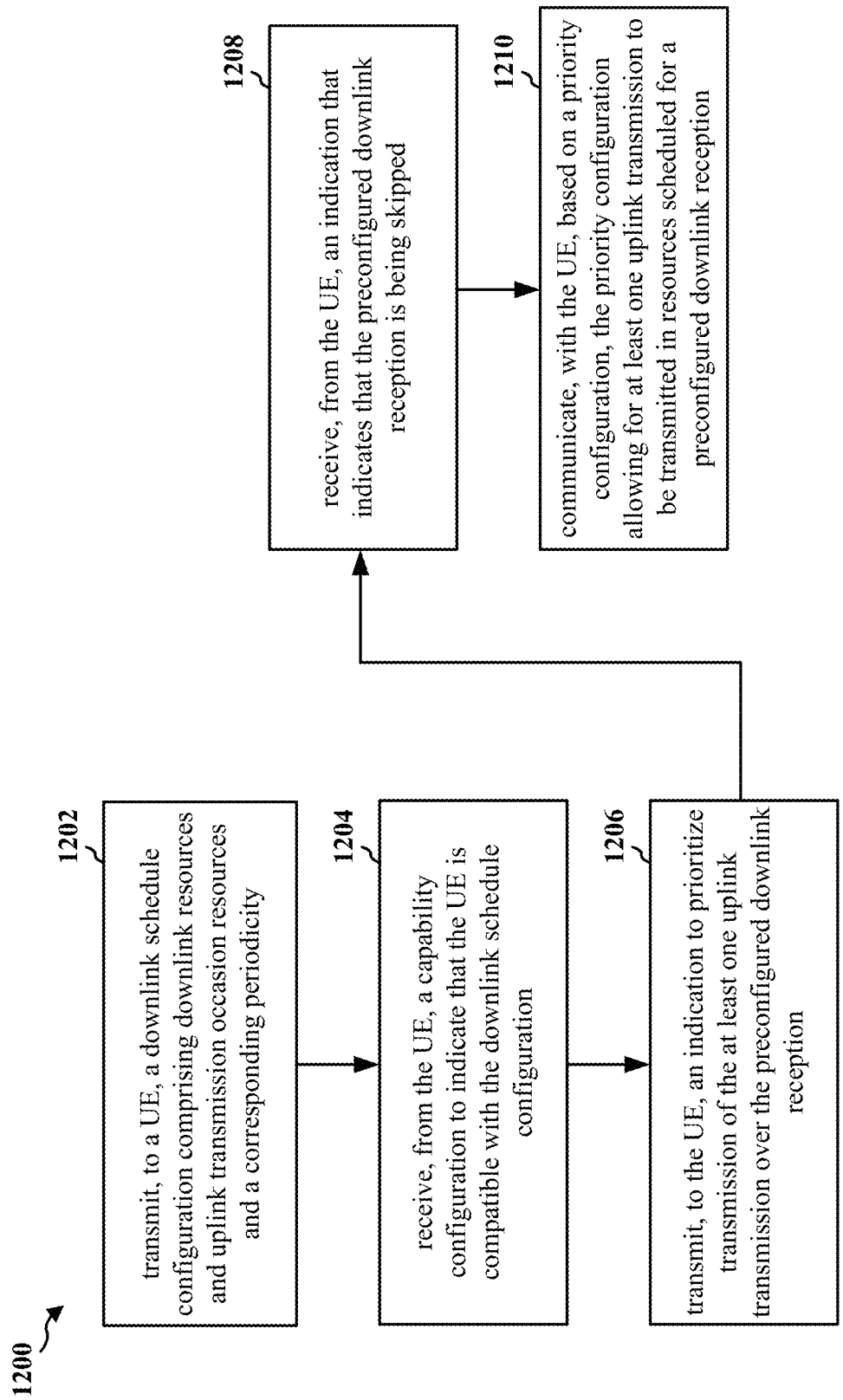
FIG. 12 is a flowchart of a method of wireless communication.

FIG. 12 is a flowchart 1200 of a method of wireless communication. The method may be performed by a base station or a component of a base station (e.g., the base station 102/180; the apparatus 1302; the baseband unit 1304, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to provide a UE with a preconfigured downlink resources and uplink transmission occasions resources and periodicity.

At 1202, the base station may transmit a downlink schedule configuration. For example, 1202 may be performed by schedule component 1340 of apparatus 1302. The base station may transmit the downlink schedule configuration to the UE. The downlink schedule configuration may comprise downlink resources and uplink transmission occasion resources and a corresponding periodicity.

At 1204, the base station may receive a capability configuration indication. For example, 1204 may be performed by capability component 1342 of apparatus 1302. The base station may receive the capability configuration indication from the UE. The capability configuration indication may indicate that the UE is compatible with the downlink schedule configuration. In some aspects, the downlink schedule configuration may comprise preconfigured downlink resources and uplink transmission occasions that at least partially overlap in time. The downlink schedule configuration may indicate the preconfigured downlink and RACH occasion symbols or resources with the periodicity, but some UEs may or may not be compatible with such downlink schedule configuration. The UE may transmit the capability configuration indication to indicate whether the UE is a UE that is compatible with or supports the downlink schedule configuration from the base station.

At 1206, the base station may transmit an indication to prioritize transmission of the at least one uplink transmission over the preconfigured reception. For example, 1206 may be performed by priority component 1344 of apparatus 1302. The base station may transmit the indication to prioritize the transmission of the at least one uplink transmission over the preconfigured reception to the UE. The base station may transmit the indication to prioritize the transmission of the at least one uplink transmission over the preconfigured reception to the UE if the UE is not compatible with the downlink schedule configuration. For example, the UE may indicate in the capability configuration indication that the UE is not compatible with or does not support the downlink schedule configuration, such that the base station may instruct the UE when to prioritize the transmission of the at least one uplink transmission. For example, a UE may need to transmit a high priority SR or a RACH preamble due to beam failure, but may not be compatible with or support the downlink schedule configuration, such that the UE may need instructions from the base station to transmit the uplink transmission instead of receiving the preconfigured or scheduled downlink reception.

At 1208, the base station may receive an indication that indicates that the preconfigured downlink reception is being skipped. For example, 1208 may be performed by skip component 1346 of apparatus 1302. The base station may receive the indication that indicates that the preconfigured downlink reception is being skipped from the UE. The indication may further indicate that the at least one uplink transmission may be transmitted on resources scheduled for the preconfigured downlink reception.

At 1210, the base station may communicate based on a priority configuration. For example, 1210 may be performed by communication component 1348 of apparatus 1302. The base station may communication with the UE based on the priority configuration. The priority configuration may allow for at least one uplink transmission to be transmitted in resources scheduled for a preconfigured downlink reception. In some aspects, the at least one uplink transmission may have a higher priority over the preconfigured downlink reception. In some aspects, the at least one uplink transmission may comprise at least one of a RACH occasion or an SR. In some aspects, the preconfigured downlink reception may comprise at least one of an SSB, a PDCCH, a PDSCH, or a CSI-RS.

Figure 13:
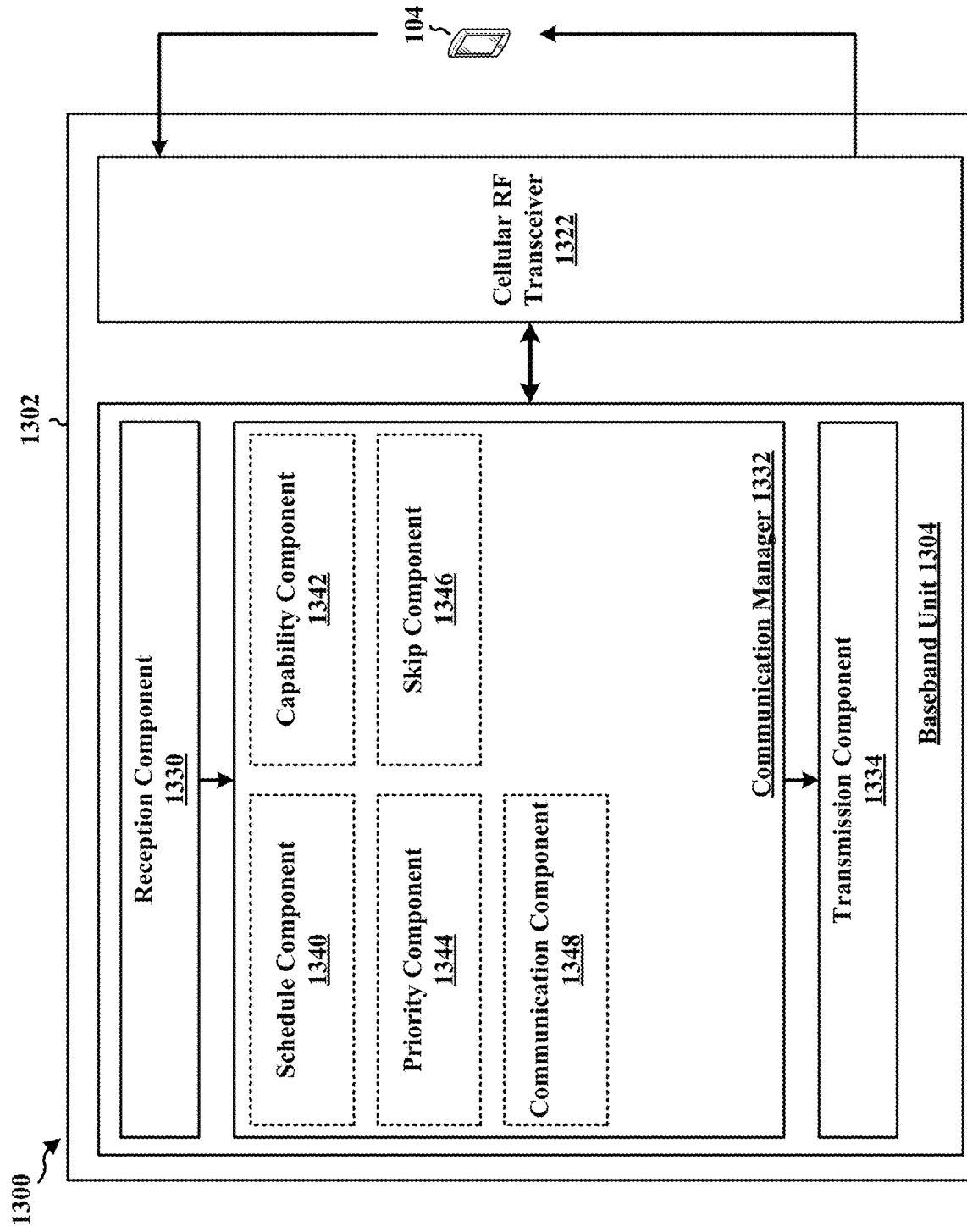
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a schedule component 1340 that may transmit a downlink schedule configuration, e.g., as described in connection with 1102 of FIG. 11 or 1202 of FIG. 12. The communication manager 1332 further includes a capability component 1342 that may receive a capability configuration indication, e.g., as described in connection with 1204 of FIG. 12. The communication manager 1332 further includes a priority component 1344 that may transmit an indication to prioritize transmission of the at least one uplink transmission over the preconfigured reception, e.g., as described in connection with 1206 of FIG. 12. The communication manager 1332 further includes a skip component 1346 that may receive an indication that indicates that the preconfigured downlink reception is being skipped, e.g., as described in connection with 1208 of FIG. 12. The communication manager 1332 further includes a communication component 1348 that may communicate based on a priority configuration, e.g., as described in connection with 1104 of FIG. 11 or 1210 of FIG. 12.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to a UE, a downlink schedule configuration comprising downlink resources and uplink transmission occasion resources and a corresponding periodicity. The apparatus includes means for communicating, with the UE, based on a priority configuration. The priority configuration allowing for at least one uplink transmission to be transmitted in resources scheduled for a preconfigured downlink reception. The apparatus further includes means for receiving, from the UE, a capability configuration to indicate that the UE is compatible with the downlink schedule configuration. The apparatus further includes means for transmitting, to the UE, an indication to prioritize transmission of the at least one uplink transmission over the preconfigured downlink reception, if the UE is not compatible with the downlink schedule configuration. The apparatus further includes means for receiving, from the UE, an indication that indicates that the preconfigured downlink reception is being skipped. The indication further indicates that the at least one uplink transmission is being transmitted on resources scheduled for the preconfigured downlink reception. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from a base station, a downlink schedule configuration comprising downlink resources and uplink transmission occasion resources and a corresponding periodicity; prioritize transmission of at least one uplink transmission over a preconfigured downlink reception based on a priority configuration, the priority configuration allowing for uplink transmissions to be transmitted in resources scheduled for the preconfigured downlink reception; and transmit, to the base station, the at least one uplink transmission based on the priority configuration.

Aspect 2 is the apparatus of aspect 1, further including a transceiver coupled to the at least one processor.

Aspect 3 is the apparatus of any of aspects 1 and 2, further includes that the at least one processor is further configured to transmit, to the base station, a capability configuration to indicate that the UE is compatible with the downlink schedule configuration.

Aspect 4 is the apparatus of any of aspects 1-3, further includes that the downlink schedule configuration comprises preconfigured downlink resources and uplink transmission occasions that at least partially overlap in time.

Aspect 5 is the apparatus of any of aspects 1-4, further includes that the at least one processor is further configured to skip receipt of the preconfigured downlink reception in response to a prioritization of the transmission of the at least one uplink transmission over the preconfigured downlink reception.

Aspect 6 is the apparatus of any of aspects 1-5, further includes that the at least one processor is further configured to transmit, to the base station, an indication that indicates that the preconfigured downlink reception is skipped, the indication further indicates that the at least one uplink transmission is being transmitted.

Aspect 7 is the apparatus of any of aspects 1-6, further includes that the at least one uplink transmission has a higher priority over the preconfigured downlink reception.

Aspect 8 is the apparatus of any of aspects 1-7, further includes that the at least one uplink transmission comprises at least one of a RACH occasion or a SR.

Aspect 9 is the apparatus of any of aspects 1-8, further includes that the preconfigured downlink reception comprises at least one of an SSB, a PDCCH, a PDSCH, or a CSI-RS.

Aspect 10 is a method of wireless communication for implementing any of aspects 1-9.

Aspect 11 is an apparatus for wireless communication including means for implementing any of aspects 1-9.

Aspect 12 is a computer-readable medium storing computer executable code, where the code when executed by a processor causes the processor to implement any of aspects 1-9.

Aspect 13 is an apparatus for wireless communication at a base station including at least one processor coupled to a memory and configured to transmit, to a UE, a downlink schedule configuration comprising downlink resources and uplink transmission occasion resources and a corresponding periodicity; and communicate, with the UE, based on a priority configuration, the priority configuration allowing for at least one uplink transmission to be transmitted in resources scheduled for a preconfigured downlink reception.

Aspect 14 is the apparatus of aspect 13, further including a transceiver coupled to the at least one processor.

Aspect 15 is the apparatus of any of aspects 13 and 14, further includes that the at least one processor is further configured to receive, from the UE, a capability configuration to indicate that the UE is compatible with the downlink schedule configuration.

Aspect 16 is the apparatus of any of aspects 13-15, further includes that the downlink schedule configuration comprises preconfigured downlink resources and uplink transmission occasions that at least partially overlap in time.

Aspect 17 is the apparatus of any of aspects 13-16, further includes that the at least one processor is further configured to transmit, to the UE, an indication to prioritize transmission of the at least one uplink transmission over the preconfigured downlink reception, if the UE is not compatible with the downlink schedule configuration.

Aspect 18 is the apparatus of any of aspects 13-17, further includes that the at least one processor is further configured to receive, from the UE, an indication that indicates that the preconfigured downlink reception is being skipped, the indication further indicates that the at least one uplink transmission is being transmitted on resources scheduled for the preconfigured downlink reception.

Aspect 19 is the apparatus of any of aspects 13-18, further includes that the at least one uplink transmission has a higher priority over the preconfigured downlink reception.

Aspect 20 is the apparatus of any of aspects 13-19, further includes that the at least one uplink transmission comprises at least one of a RACH occasion or an SR.

Aspect 21 is the apparatus of any of aspects 13-20, further includes that the preconfigured downlink reception comprises at least one of an SSB, a PDCCH, a PDSCH, or a CSI-RS.

Aspect 22 is a method of wireless communication for implementing any of aspects 13-21.

Aspect 23 is an apparatus for wireless communication including means for implementing any of aspects 13-21.

Aspect 24 is a computer-readable medium storing computer executable code, where the code when executed by a processor causes the processor to implement any of aspects 13-21.

What is claimed is:

1. An apparatus for wireless communication at a user equipment (UE), comprising:
   a memory; and
   at least one processor coupled to the memory and configured to:
   receive, from a base station, a downlink schedule configuration comprising downlink resources and uplink transmission occasion resources and a corresponding periodicity;
   prioritize transmission of at least one uplink transmission over a preconfigured downlink reception based on a priority configuration, the priority configuration allowing for the at least one uplink transmission to be transmitted in resources scheduled for the preconfigured downlink reception; and
transmit, to the base station, the at least one uplink transmission based on the priority configuration.

2. The apparatus of claim 1, further comprising a transceiver coupled to the at least one processor.

3. The apparatus of claim 1, wherein the at least one processor is further configured to:
transmit, to the base station, a capability configuration to indicate that the UE is compatible with the downlink schedule configuration.

4. The apparatus of claim 3, wherein the downlink schedule configuration comprises preconfigured downlink resources and uplink transmission occasions that at least partially overlap in time.

5. The apparatus of claim 1, wherein the at least one processor is further configured to:
skip receipt of the preconfigured downlink reception in response to a prioritization of the transmission of the at least one uplink transmission over the preconfigured downlink reception.

6. The apparatus of claim 5, wherein the at least one processor is further configured to:
transmit, to the base station, an indication that indicates that the preconfigured downlink reception is skipped, the indication further indicates that the at least one uplink transmission is being transmitted.

7. The apparatus of claim 1, wherein the at least one uplink transmission has a higher priority over the preconfigured downlink reception.

8. The apparatus of claim 1, wherein the at least one uplink transmission comprises at least one of a random access channel (RACH) occasion or a scheduling request (SR).

9. The apparatus of claim 1, wherein the preconfigured downlink reception comprises at least one of a synchronization signal block (SSB), a physical downlink control channel (PDCCH), a physical downlink shared channel (PDSCH), or a channel state information reference signal (CSI-RS).

10. A method of wireless communication at a user equipment (UE), comprising:
receiving, from a base station, a downlink schedule configuration comprising downlink resources and uplink transmission occasion resources and a corresponding periodicity;
prioritizing transmission of at least one uplink transmission over a preconfigured downlink reception based on a priority configuration, the priority configuration allowing for the at least one uplink transmission to be transmitted in resources scheduled for the preconfigured downlink reception; and
transmitting, to the base station, the at least one uplink transmission based on the priority configuration.

11. The method of claim 10, further comprising:
transmitting, to the base station, a capability configuration to indicate that the UE is compatible with the downlink schedule configuration.

12. The method of claim 11, wherein the downlink schedule configuration comprises preconfigured downlink resources and uplink transmission occasions that at least partially overlap in time.

13. The method of claim 10, further comprising:
skipping receipt of the preconfigured downlink reception in response to a prioritization of the transmission of the at least one uplink transmission over the preconfigured downlink reception.

14. The method of claim 13, further comprising:
transmitting, to the base station, an indication that indicates that the preconfigured downlink reception is skipped, the indication further indicates that the at least one uplink transmission is being transmitted.

15. The method of claim 10, wherein the at least one uplink transmission has a higher priority over the preconfigured downlink reception.

16. An apparatus for wireless communication at a base station, comprising:
a memory; and
at least one processor coupled to the memory and configured to:
transmit, to a user equipment (UE), a downlink schedule configuration comprising downlink resources and uplink transmission occasion resources and a corresponding periodicity; and
communicate, with the UE, based on a priority configuration, the priority configuration allowing for at least one uplink transmission to be transmitted in resources scheduled for a preconfigured downlink reception.

17. The apparatus of claim 16, further comprising a transceiver coupled to the at least one processor.

18. The apparatus of claim 16, wherein the at least one processor is further configured to:
receive, from the UE, a capability configuration to indicate that the UE is compatible with the downlink schedule configuration.

19. The apparatus of claim 18, wherein the downlink schedule configuration comprises preconfigured downlink resources and uplink transmission occasions that at least partially overlap in time.

20. The apparatus of claim 18, wherein the at least one processor is further configured to:
transmit, to the UE, an indication to prioritize transmission of the at least one uplink transmission over the preconfigured downlink reception, if the UE is not compatible with the downlink schedule configuration.

21. The apparatus of claim 16, wherein the at least one processor is further configured to:
receive, from the UE, an indication that indicates that the preconfigured downlink reception is being skipped, the indication further indicates that the at least one uplink transmission is being transmitted on resources scheduled for the preconfigured downlink reception.

22. The apparatus of claim 16, wherein the at least one uplink transmission has a higher priority over the preconfigured downlink reception.

23. The apparatus of claim 16, wherein the at least one uplink transmission comprises at least one of a random access channel (RACH) occasion or a scheduling request (SR).

24. The apparatus of claim 16, wherein the preconfigured downlink reception comprises at least one of a synchronization signal block (SSB), a physical downlink control channel (PDCCH), a physical downlink shared channel (PDSCH), or a channel state information reference signal (CSI-RS).

25. A method of wireless communication at a base station, comprising:

transmitting, to a user equipment (UE), a downlink schedule configuration comprising downlink resources and uplink transmission occasion resources and a corresponding periodicity; and communicating, with the UE, based on a priority configuration, the priority configuration allowing for at least one uplink transmission to be transmitted in resources scheduled for a preconfigured downlink reception.

26. The method of claim 25, further comprising:

receiving, from the UE, a capability configuration to indicate that the UE is compatible with the downlink schedule configuration.

27. The method of claim 26, wherein the downlink schedule configuration comprises preconfigured downlink resources and uplink transmission occasions that at least partially overlap in time.

28. The method of claim 26, further comprising:

transmitting, to the UE, an indication to prioritize transmission of the at least one uplink transmission over the preconfigured downlink reception, if the UE is not compatible with the downlink schedule configuration.

29. The method of claim 25, further comprising:

receiving, from the UE, an indication that indicates that the preconfigured downlink reception is being skipped, the indication further indicates that the at least one uplink transmission is being transmitted on resources scheduled for the preconfigured downlink reception.

30. The method of claim 25, wherein the at least one uplink transmission has a higher priority over the preconfigured downlink reception.

* * * * *